(No Model.)
J. SLOOP.
SPIKE EXTRACTOR.
No. 322,133. Patented July 14, 1885.
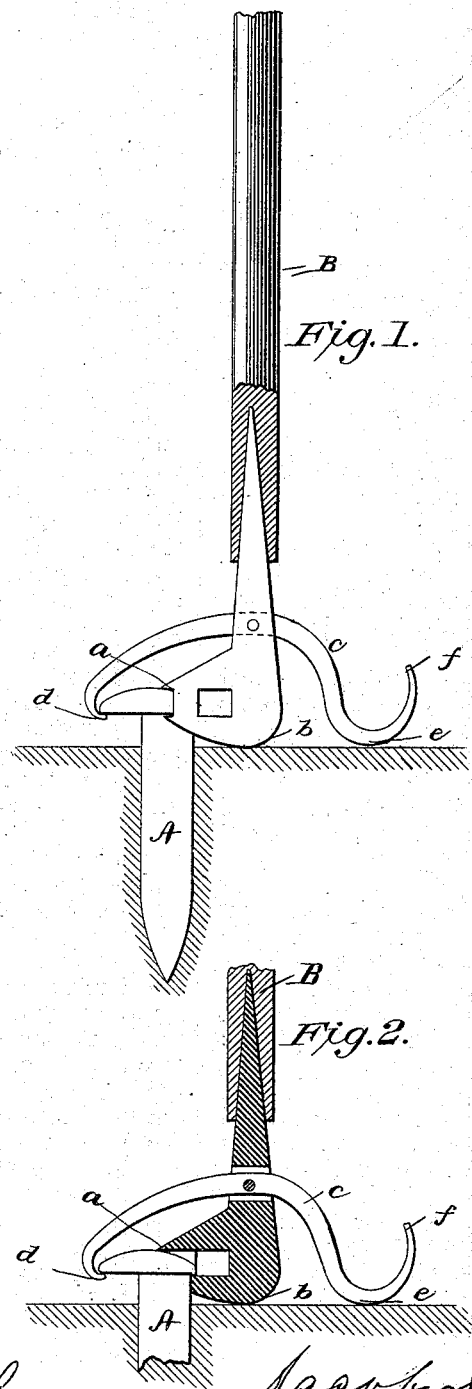
Witnesses:
Clarence M Lewis
Frederick A Miller
Jacob Sloop Inventor.

UNITED STATES PATENT OFFICE.

JACOB SLOOP, OF CANTON, KANSAS.

SPIKE-EXTRACTOR.

SPECIFICATION forming part of Letters Patent No. 322,133, dated July 14, 1885.

Application filed March 18, 1884. (No model.)

*To all whom it may concern:*

Be it known that I, JACOB SLOOP, a citizen of the United States, residing at Canton, in the county of McPherson and State of Kansas, have invented certain new and useful Improvements in Railroad-Spike Drawers, of which the following is a specification.

My invention has reference to implements for extracting railroad and other spikes; and it consists in the improvements hereinafter described and employed.

In the accompanying drawings, forming part of the specification, Figure 1 is a side elevation representing the device, and Fig. 2 is a central vertical section of the lower operating portion of the implement.

$a$ has reference to the body of the spike, which is provided at its upper end with a head, as usual.

B represents the handle of the implement, which is provided at its lower portion with the extracting operator, having its front end formed to present the claws $a$ and its lower portion rounded to present a fulcrum, $b$.

The implement proper is horizontally slotted for the passage of an arm, $c$, the front end, $d$, of which is bent downward and inward to engage with the flange presented by the head of the spike. The rear portion of the arm is bent downward and curved to form the extended fulcrum $e$, the terminal portion of said arm being bent vertically to form a curved extension, $f$. It will be seen that when the claw $a$ engages one side of the spike and the implement moves on the fulcrum $b$, the spike will be partially extracted, the further movement of the implement resulting in bringing the operating fulcrum of the device upon the fulcrum $e$ of the arm, the end of which remains more firmly in engagement with the head of the spike and serves to further extract the same. It will be thus seen that in the primary operation of extracting the spike all of the strain and movement is upon the implement proper; that after the said implement has withdrawn the spike to the extent of its capacity the further extraction depends upon the arm $c$, upon the fulcrums $e$ and $b$ of which the operating strain is brought, which causes the bent end $d$ to more firmly contact with and engage the flanged head of the spike, enabling the arm $c$ to complete the extracting movement.

I claim—

The combination, in an extractor, of the horizontal perforated implement proper, provided with claws $a$, and with bearing portions $b$, and an arm, $c$, pivoted in the perforation of said implement proper, bent downward at its front end, as described, to operate in connection with said claws to secure a primary extraction of the spike, and curved, as described, at its rear end to form the extended fulcrum and bearing portions $e$ and $f$, co-operating with the claws and bent portion $d$, to secure final extraction, substantially as set forth.

JACOB SLOOP.

Witnesses:
CLARENCE M. LEWIS,
FREDERICK A. MILLER.